(12) United States Patent
Park (10) Patent No.: US 8,133,409 B2
(45) Date of Patent: *Mar. 13, 2012

(54) LIQUID CRYSTAL DISPLAY DEVICE AND METHOD OF FABRICATING THE SAME

(75) Inventor: Su Hyun Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1158 days.

This patent is subject to a terminal disclaimer.

(21) Appl. No.: 11/451,384

(22) Filed: Jun. 13, 2006

(65) Prior Publication Data

US 2006/0280879 A1 Dec. 14, 2006

(30) Foreign Application Priority Data

Jun. 14, 2005 (KR) .................. 10-2005-0051036

(51) Int. Cl.
*C09K 19/00* (2006.01)
*C09K 19/06* (2006.01)
*C09K 19/52* (2006.01)

(52) U.S. Cl. .......... 252/299.01; 430/20; 430/320; 428/1.1; 428/1.2; 428/1.25; 428/1.26; 349/123

(58) Field of Classification Search ............. 428/1.1, 428/1.2, 1.25–26; 430/20, 320; 349/123; 252/299.01

See application file for complete search history.

(56) References Cited

U.S. PATENT DOCUMENTS

| | | | |
|---|---|---|---|
| 5,764,326 A | 6/1998 | Hasegawa et al. | |
| 6,469,763 B2* | 10/2002 | Kim et al. | 349/124 |
| 6,707,520 B2 | 3/2004 | Park et al. | |
| 7,244,627 B2* | 7/2007 | Lee et al. | 438/30 |
| 7,442,494 B2* | 10/2008 | Park | 430/321 |
| 7,514,514 B2* | 4/2009 | Buchecker et al. | 526/303.1 |

FOREIGN PATENT DOCUMENTS

| | | |
|---|---|---|
| CN | 1232982 | 10/1999 |
| KR | 10-2002-0011054 | 2/2002 |
| KR | 10-2004-0035437 | 4/2004 |

* cited by examiner

*Primary Examiner* — Geraldina Visconti

(74) *Attorney, Agent, or Firm* — Morgan, Lewis & Bockius LLP (57) ABSTRACT

A method of fabricating a liquid crystal display (LCD) device includes preparing at least a first substrate, coating an alignment material on at least the first substrate, aligning a main chain of the alignment material in a predetermined direction, and irradiating polarized ultraviolet (UV) rays onto the alignment material whose main chain has been aligned in the predetermined direction to form an alignment layer.

11 Claims, 8 Drawing Sheets

LIQUID CRYSTAL DISPLAY DEVICE AND METHOD OF FABRICATING THE SAME

This application claims the benefit of the Patent Korean Application No. P2005-0051036, filed on Jun. 14, 2005, which is hereby incorporated by reference as if fully set forth herein.

BACKGROUND OF THE INVENTION

1. Field of the Invention

The present invention relates to a liquid crystal display (LCD) device, and more particularly, to an alignment layer for initial alignment of liquid crystals in an LCD device.

2. Discussion of the Related Art

Among ultra thin flat panel display devices having a display screen of a thickness of several centimeters, LCD devices have been widely used for notebook computers, monitors, spacecrafts, aircrafts, and other applications due to their features and advantages of low driving voltage, low power consumption, portability, and the like. Generally, an LCD device includes a color filter substrate having color filter layers formed thereon, a thin film transistor substrate facing the color filter substrate and having thin film transistors formed thereon, and a liquid crystal layer formed between these substrates.

In such an LCD device, alignment of the liquid crystal layer is changed by applying a voltage to control transmittance of light, thereby generating an image. In order to affect the alignment of the liquid crystals, electrodes are formed on the thin film transistor substrate and/or the color filter substrate for application of voltage. In a twisted nematic (TN) mode LCD device, for example, a pixel electrode is located on the thin film transistor substrate and a common electrode is located on the color filter substrate so as to generate a vertical electric field between the two substrates. In an in-plane switching (IPS) mode LCD device, for example, the pixel electrode and the common electrode are located parallel to each other on the thin film transistor substrate so as to generate a horizontal electric field.

Figure 1:
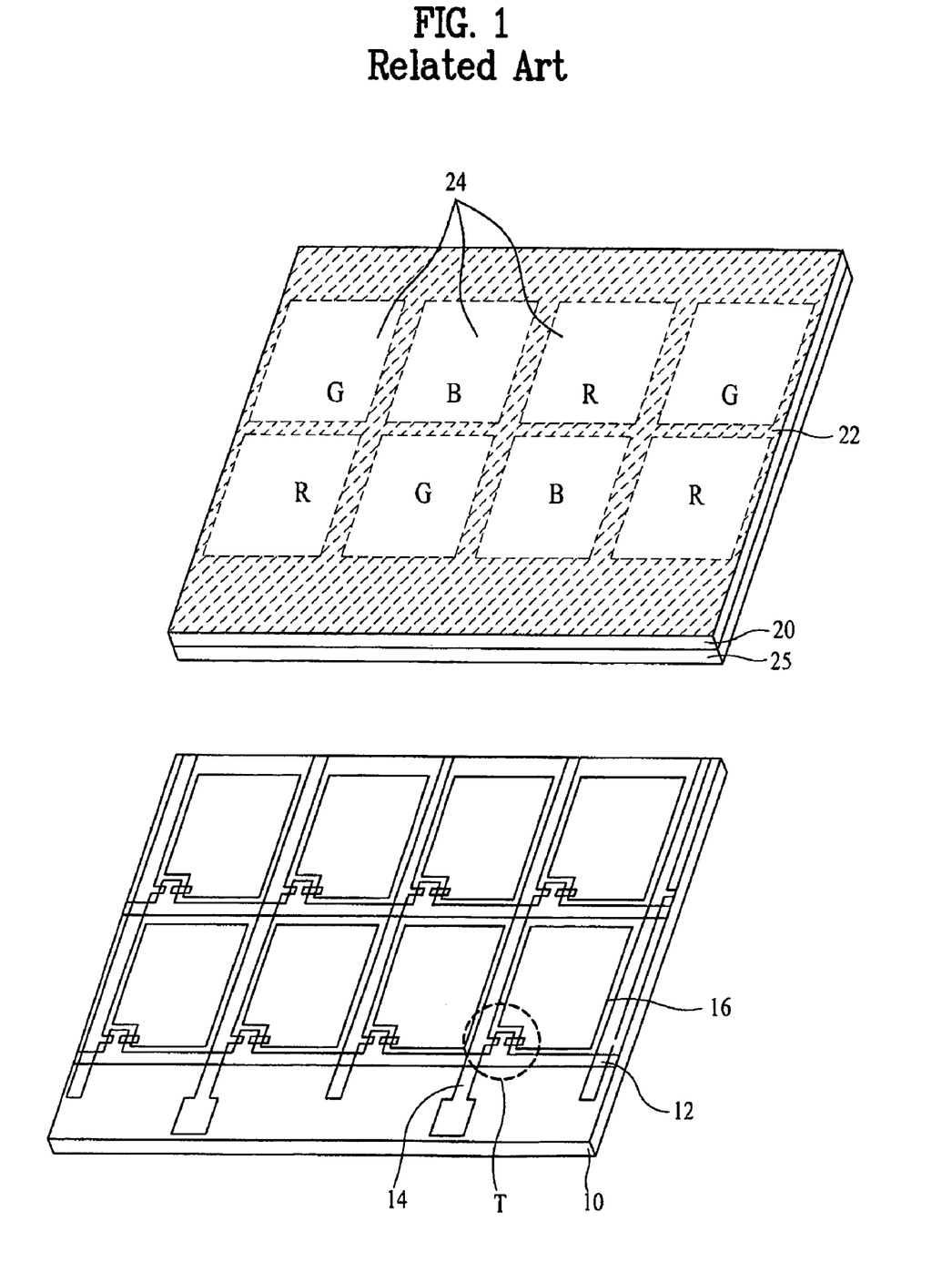
FIG. 1 is an exploded perspective view illustrating a related art TN mode LCD device.

FIG. 1 is an exploded perspective view illustrating a related art TN mode LCD device. As shown in FIG. 1, a thin film transistor substrate 10 includes a gate line 12, a data line 14 crossing the gate line 12, a thin film transistor T formed at a crossing region of the gate line 12 and the data line 14, and a pixel electrode 16 connected to the thin film transistor T. A color filter substrate 20 includes a light-shielding layer (or black matrix) 22 to prevent leakage of light, R, G, and B color filter layers 24, and a common electrode 25 formed on the color filter substrate 20. In this manner, a vertical electric field is generated between the pixel electrode 16 on the thin film transistor substrate 10 and the common electrode 25 on the color filter substrate 20, thereby allowing alignment of liquid crystals to be controlled.

The substrates 10 and 20 constructed as described above are bonded to each other to form a single liquid crystal panel with a liquid crystal layer formed between the substrates 10 and 20. If the liquid crystal layer is randomly aligned between the substrates 10 and 20, it is difficult to achieve a consistent arrangement of molecules in the liquid crystal layer. Thus, although not shown in the drawings, an alignment layer for the initial alignment of liquid crystals is formed in the thin film transistor substrate 10 and/or the color filter substrate 20.

Examples of a method for forming an alignment layer for initial alignment of the liquid crystal include a rubbing alignment method and a photo-alignment method. In the rubbing alignment method, after an organic polymer such as polyimide is thinly coated on a substrate, a rubbing roll wound with a rubbing cloth is rotated on the coated substrate to rub the organic polymer, thereby arranging the organic polymer in a uniform direction.

However, the rubbing alignment method has the following drawbacks. Contaminant materials, such as dust, may be attached to the surface of the substrate due to static electricity generated by friction between the rubbing cloth and the organic polymer. Further, when the arrangement of the rubbing cloth becomes misaligned, a problem of light leakage may occur. Such problems with the rubbing alignment method are caused by the mechanism for providing physical contact between the rubbing roll and the substrate.

In order to solve the problems of the rubbing alignment method, various studies have been conducted for providing a method for manufacturing an alignment layer without the need of physical contact. Thus, instead of using the rubbing alignment method, use of a photo-alignment method has been suggested. The photo-alignment method produces an alignment layer by irradiating polarized ultraviolet (UV) rays onto an alignment material having a photo-reaction group. In order to align the liquid crystals, the alignment layer must have an anisotropic structure, which can be formed when the photo-reaction group is anisotropically reacted with the polarized UV rays.

Although the photo-alignment method may address the problems related to the rubbing alignment method described above, the photo-alignment method has a serious problem in that anchoring energy is low, thereby creating an afterimage. More specifically, because polarized UV rays are used in the photo-alignment method, only the photo-reaction group identical with the polarized direction of the UV rays undergoes a photo-reaction, thereby failing to form a desired anisotropic structure.

In particular, the alignment material coated on the substrate is in a random arrangement having no particular direction. Therefore, a response rate is reduced and too little anisotropy obtained if only the photo-reaction group identical with the polarized direction of the UV rays undergoes the photo-reaction. As a result, the photo-alignment method provides lower anchoring energy and causes a problem of afterimage effects. In order to solve the problems caused by the reduced response rate in the photo-alignment method, various methods have been studied.

First, there is a method for improving the response rate by heating a substrate when irradiating UV rays. However, this method is not suitable for mass production because arranging a heating device to heat the substrate becomes difficult if the size of the substrate becomes large.

Second, there is a method for improving a response rate by increasing density of a photo-reaction group of an alignment layer. However, this method causes too high reaction group. In such as case, liquid crystals are not aligned well due to steric hindrance caused by such high reaction group.

Finally, there is a method for improving a response rate by using an alignment layer having a low molecular weight. However, this method fails to provide stable alignment of liquid crystals.

SUMMARY OF THE INVENTION

Accordingly, the present invention is directed to a method of fabricating an LCD device that substantially obviates one or more problems due to limitations and disadvantages of the related art.

An object of the present invention is to provide a method of fabricating an LCD device in which a photo-response rate is improved in forming an alignment layer.

Another object of the present invention is to provide a method of fabricating an LCD device having an alignment layer with high anchoring energy.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method of fabricating a liquid crystal display (LCD) device includes preparing at least a first substrate, coating an alignment material on at least the first substrate, aligning a main chain of the alignment material in a predetermined direction, and irradiating polarized ultraviolet (UV) rays onto the alignment material whose main chain has been aligned in the predetermined direction to form an alignment layer.

In another aspect, the liquid crystal display (LCD) device includes at least one substrate and an alignment layer over the substrate, wherein the alignment layer includes material having a main chain adapted to be aligned by a rubbing process and a photo-reactive side chain adapted to be aligned by irradiation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

The present invention includes a step of aligning a main chain of an alignment material in a predetermined direction before the step of irradiating polarized ultraviolet (UV) rays to align a side chain of the alignment material to improve a response rate. In particular, the response rate of the alignment material is improved by increasing a photo-reaction group that undergoes a photo-action. As the response rate is improved, anisotropic characteristics of an alignment layer can be increased, thereby obtaining high anchoring energy.

In an exemplary embodiment of the invention, the step of aligning the main chain of the alignment material is performed by a soft rubbing process. The soft rubbing process is not an alignment process for aligning liquid crystals. Therefore, the soft rubbing process is distinguished from a strong rubbing process, which is the typical process for aligning the liquid crystals. For example, the soft rubbing process is performed at a rubbing strength in the range of about 20 mm to about 160 mm.

The rubbing strength (RS) is expressed by Equation 1:

$$RS = Nl(1 + 2\pi r n/60V),\qquad\text{[Equation 1]}$$

wherein "N" is the number of times of rubbing, "l" is a rubbing depth, "r" is a radius of a roll, "n" is the revolutions per minute (rpm), and "V" is moving velocity of the roll.

Since the rubbing strength depends on the number of times of rubbing, the rubbing depth, the radius of the roll, rpm, and the moving velocity of the roll, it is possible to control the rubbing strength by adjusting each value appropriately. In the exemplary embodiment of the present invention, the rubbing strength can be controlled in the range of about 20 mm to about 160 mm.

Since the number of times of rubbing, the radius of the roll, rpm, and the moving velocity of the roll depends on a structure of the LCD device and a production line, the rubbing strength depends on the rubbing depth. Therefore, it is possible to actually control the rubbing strength by adjusting the rubbing depth.

Figure 2:
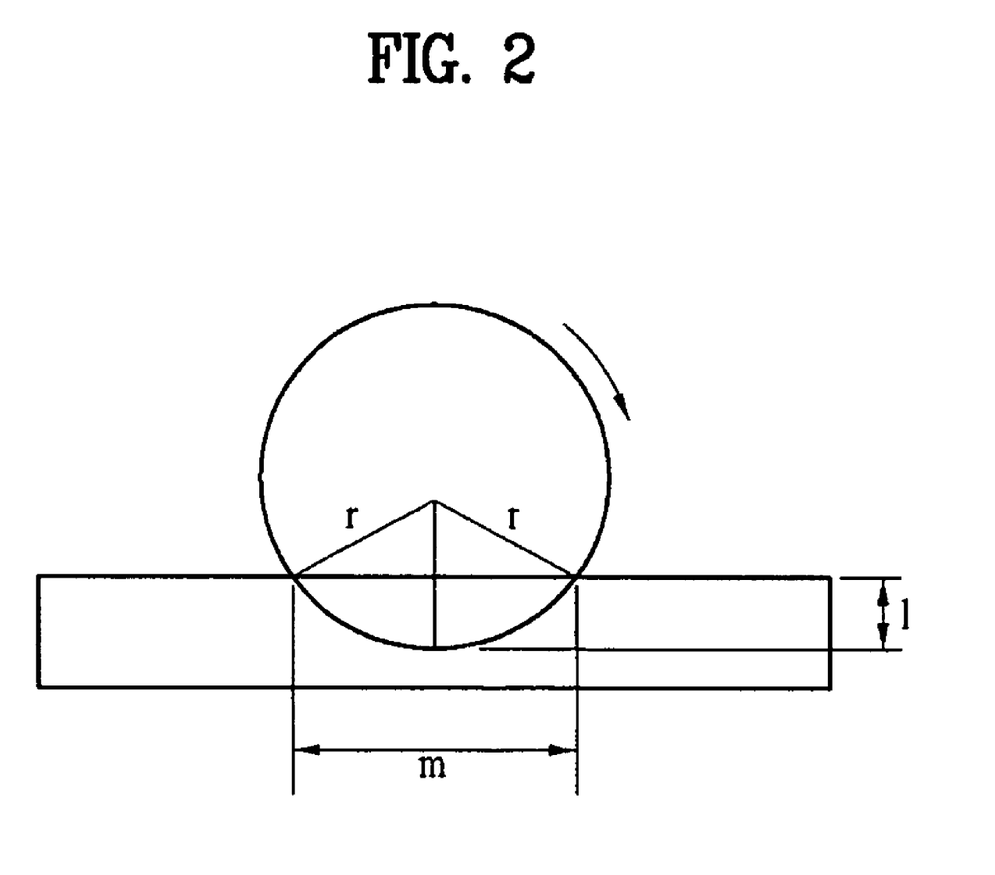
FIG. 2 is a view illustrating the relationship of various dimensions of a roller and a surface in determining a rubbing strength.

The rubbing depth can be expressed by Equation 2:

$$l = r - (r^2 - (m/2)^2)^{0.5},\qquad\text{[Equation 2]}$$

where "l" is the rubbing depth, "r" is the radius of the roll, and "m" is a mark width. (See FIG. 2.)

The rubbing depth depends on the mark width. Therefore, it is possible to control the rubbing depth by controlling the mark width, thereby controlling the rubbing strength. For example, by setting the mark width in the range of about 6 mm to 14 mm using a typical rubbing setup, the rubbing strength in the range of about 20 mm to about 160 mm can be achieved.

Table 1 the rubbing strengths (RS) based on varying mark widths using a typical rubbing setup. For purposes of example, the number of times of rubbing (N) is set as two times, the radius of the roll (r) is in the range of 67.06 mm, rpm of the roll (n) is set as 600/min, and the moving velocity of the roll is set as 20 mm/s. For mass production, the number of times of rubbing (N) is set as one time.

TABLE 1

| Mark width(mm) | Rubbing strength(mm) |
| --- | --- |
| 6 | 28.0 |
| 7 | 36.6 |
| 8 | 49.8 |
| 9 | 64.2 |
| 10 | 79.0 |
| 11 | 95.6 |
| 12 | 113.9 |
| 13 | 133.7 |
| 14 | 155.1 |
| 15 | 178.1 |
| 16 | 202.7 |
| 17 | 229.0 |
| 18 | 256.8 |
| 19 | 286.3 |
| 20 | 317.4 |

Figure 3A:
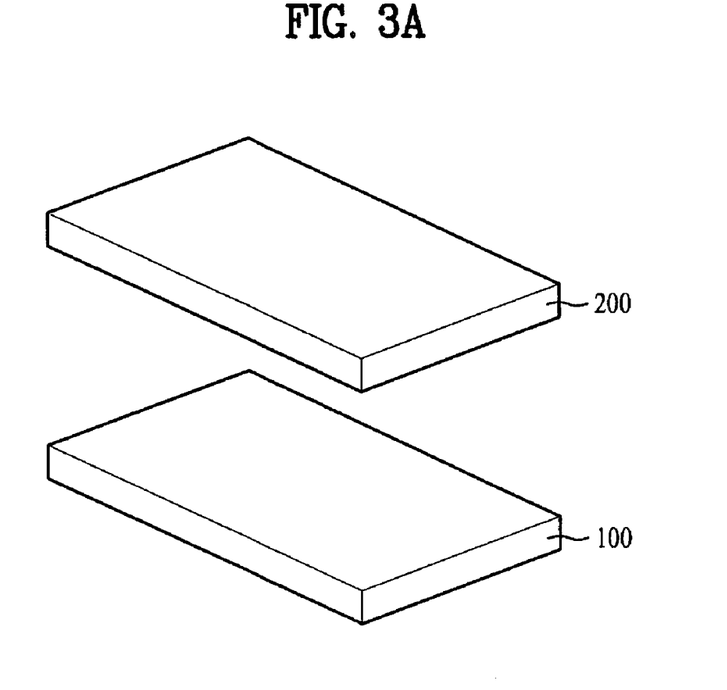
FIGS. 3A to 3E are process views illustrating a method of fabricating an LCD device according to an exemplary embodiment of the present invention.

FIGS. 3A to 3E illustrate a method of fabricating an LCD device according to the exemplary embodiment of the present invention. First, as shown in FIG. 3A, a lower substrate 100 and an upper substrate 200 are prepared. Various modifications can be made in the structures of the lower substrate 100 and the upper substrate 200 depending on modes of the LCD device without departing from the scope of the present invention.

In a TN mode LCD device, for example, the lower substrate 100 includes a gate line and a data line crossing each other to define a pixel region thereon, a thin film transistor formed in a crossing region of the gate line and the data line where the thin film transistor includes a gate electrode, a source electrode and a drain electrode, and a pixel electrode connected to the drain electrode of the thin film transistor. The upper substrate 200 of the TN mode LCD device includes a light-shielding layer shielding leakage of light, R, G, and B color filter layers, and a common electrode formed on the color filter layers.

In an IPS mode LCD device, for example, the lower substrate 100 includes a gate line and a data line crossing each other to define a pixel region thereon, a thin film transistor formed on a crossing region of the gate line and the data line where the thin film transistor includes a gate electrode, a source electrode and a drain electrode, a pixel electrode connected to the drain electrode of the thin film transistor, and a common electrode formed parallel to the pixel electrode. The upper substrate 200 of the IPS mode LCD device includes a light-shielding layer shielding leakage of light, R, G, and B color filter layers, and an overcoat layer formed on the color filter layers.

Figure 3B:
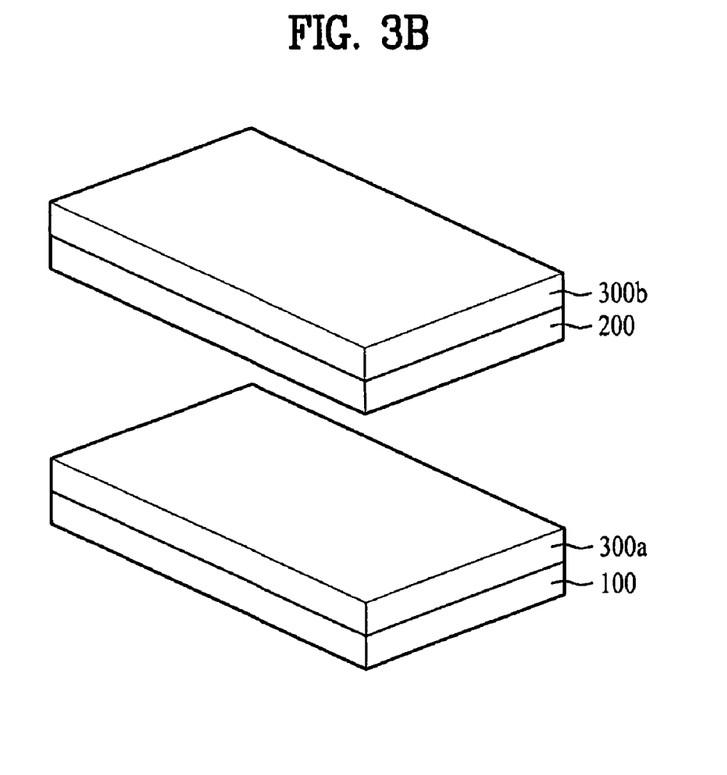

Then, as shown in FIG. 3B, alignment layers 300a and 300b are respectively coated on the lower substrate 100 and the upper substrate 200. Although the alignment layers 300a and 300b are formed on both substrates 100 and 200 in the drawing, the alignment layer may be formed on only one of the substrates without departing from the scope of the present invention.

Coating of the alignment layers 300a and 300b is completed by printing the alignment layers on the substrates 100 and 200, for example, and curing the printed alignment layers. The step of printing the alignment layers may be performed by spin coating or roll coating after dissolving the alignment material in an organic solvent, for example. Moreover, the step of curing the printed alignment layers may be performed by twice curing at a temperature range between about 60° C. and about 80° C. and between about 80° C. and about 230° C., for example. Other coating and curing processes may be used without departing from the scope of the present invention.

Figure 5:
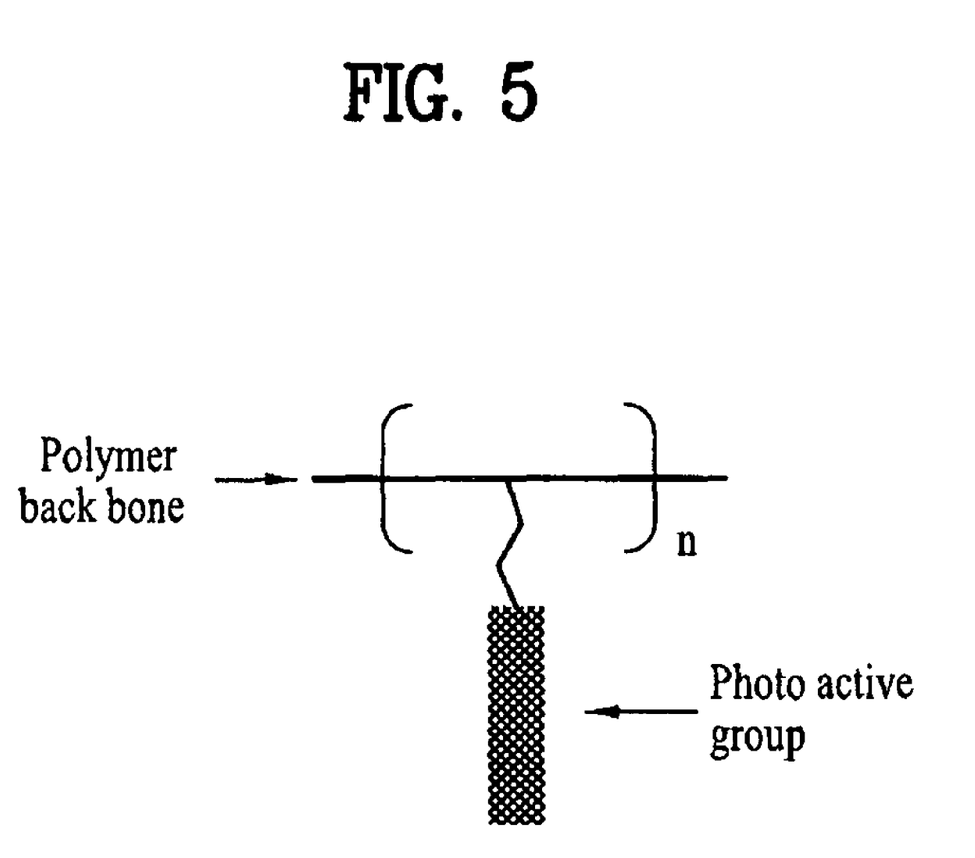
FIG. 5 is a structural view of an exemplary composition of the present invention.

As shown in FIG. 5, the alignment material according to the present invention has a main chain (i.e., back bone) that is capable of being aligned by rubbing, such as a polymer back bone, and a photo-reactive side chain that is capable of being aligned by irradiation, such as materials having cinnamoly moiety, azo coupling, coumarin, chalcone, and the like.

As an example, the alignment layers 300a and 300b may be formed a polymeric material selected from a group of polyimide, polyamic acid, polynorbornene, phenylmaleimide copolymer, polyvinylcinnamate, polyazobenzene, polyethyleneimine, polyvinyl alcohol, polyamide, polyethylene, polystyrene, polyphenylenephthalamide, polyester, polyurethane, and polymethyl methacrylate. Moreover, any material that undergoes photo-decomposition, photo-dimerization or photo-isomerization may be used for the alignment layers 300a and 300b.

More specifically, the alignment layers 300a and 300b may be formed of polyimide of the following chemical formula 1, phenylmaleimide copolymer of the following chemical formula 2, polynorbornene of the following chemical formula 3, or polyamic acid of the following chemical formula 4. In the formulas, "m" and "n" are integers not less than 1.

Chemical formula 1:

Chemical formula 2:

Chemical formula 3:

-continued

Chemical formula 4:

However, other materials having a polymer back bone with photo-reactive side chain may be used without departing from the scope of the present invention.

Figure 3C:
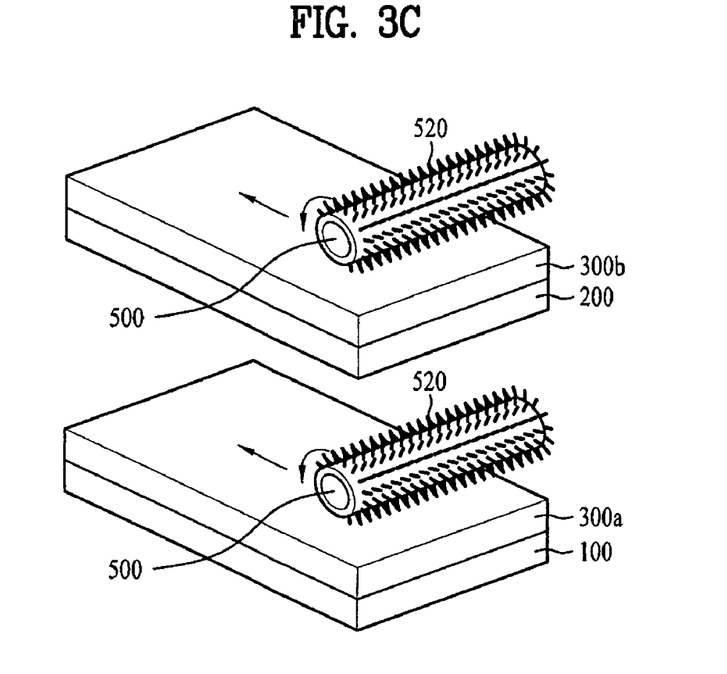

As shown in FIG. 3C, a soft rubbing process is performed on the substrates 100 and 200 coated with the alignment layers 300a and 300b. More specifically, the soft rubbing process is performed by rubbing the alignment layers 300a and 300b with a rubbing roll 500 attached with a rubbing cloth 520 in a desired alignment direction. The soft rubbing process is performed with the rubbing strength in the range of about 20 mm to about 160 mm by varying various values described above, such as varying the mark width in the range of about 6 mm to about 14 mm. As another example, the soft rubbing process is performed in the range of the rubbing strength of about 20 mm to about 160 mm by setting the number of times of rubbing to 1.

Figure 3D:
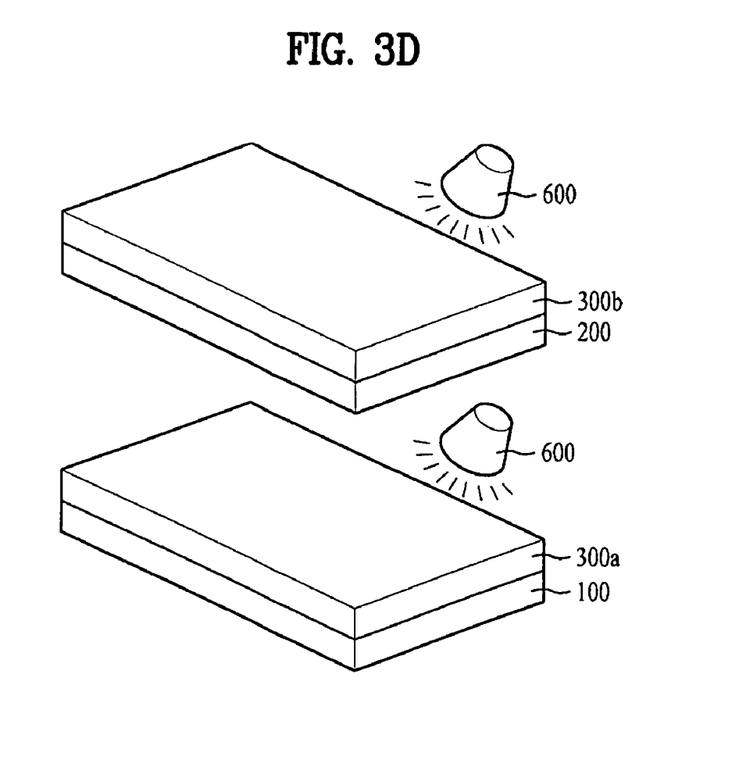
Figure 3E:
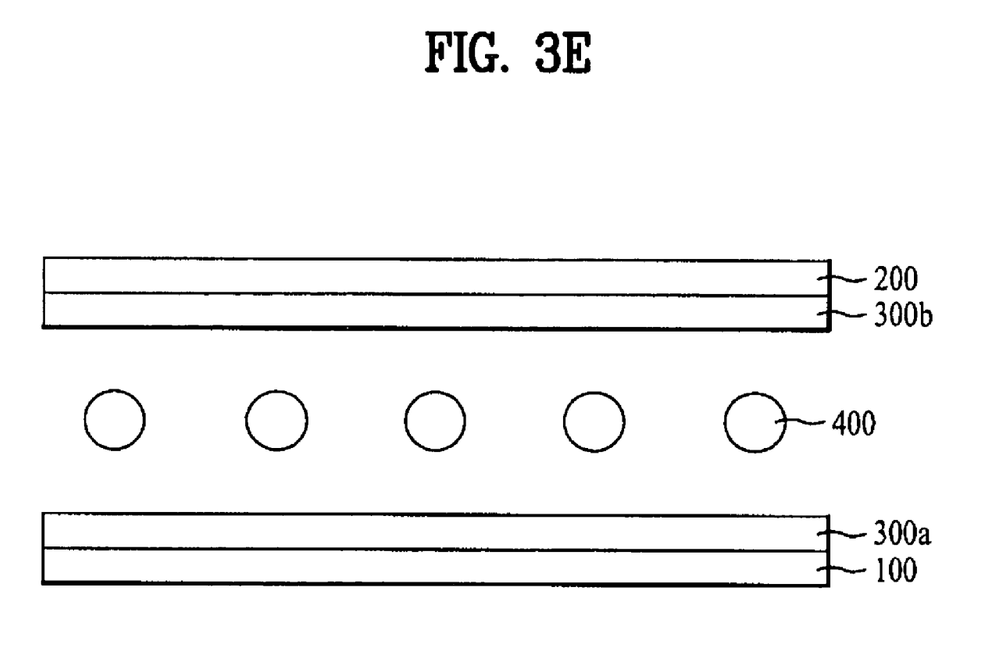

As shown in FIG. 3D, polarized UV rays are irradiated onto the substrates 100 and 200 having the soft-rubbed alignment layers 300a and 300b using an UV irradiation device 600. Afterwards, the substrates 100 and 200 are bonded to each other as shown in FIG. 3E. For example, the substrates 100 and 200 may be bonded to each other by a vacuum injection method or a liquid crystal dropping method.

The vacuum injection method includes injecting the liquid crystal using the pressure difference under a vacuum state after bonding the substrates 100 and 200 to each other. The liquid crystal dropping method involves bonding the substrates to each other after dropping the liquid crystal onto any one of the substrates. The liquid crystal dropping method is typically more advantageous for larger sized substrates since the vacuum injection method requires an increased liquid injection time, which results in reduction of productivity.

The soft rubbing process and the UV irradiation process according to the present invention are performed such that the alignment direction of the alignment layers from the soft rubbing process is in the same direction as the alignment direction of the alignment layers from the UV irradiation process. To this end, the polarized direction of the UV rays can be controlled appropriately depending on types of the alignment layers. In other words, the UV alignment method may be classified into a photo-decomposition reaction, a photo-isomerization reaction, and a photo-dimerization reaction depending on the kind of reaction between the alignment material to be applied to the substrates and the UV rays.

Figure 4A:
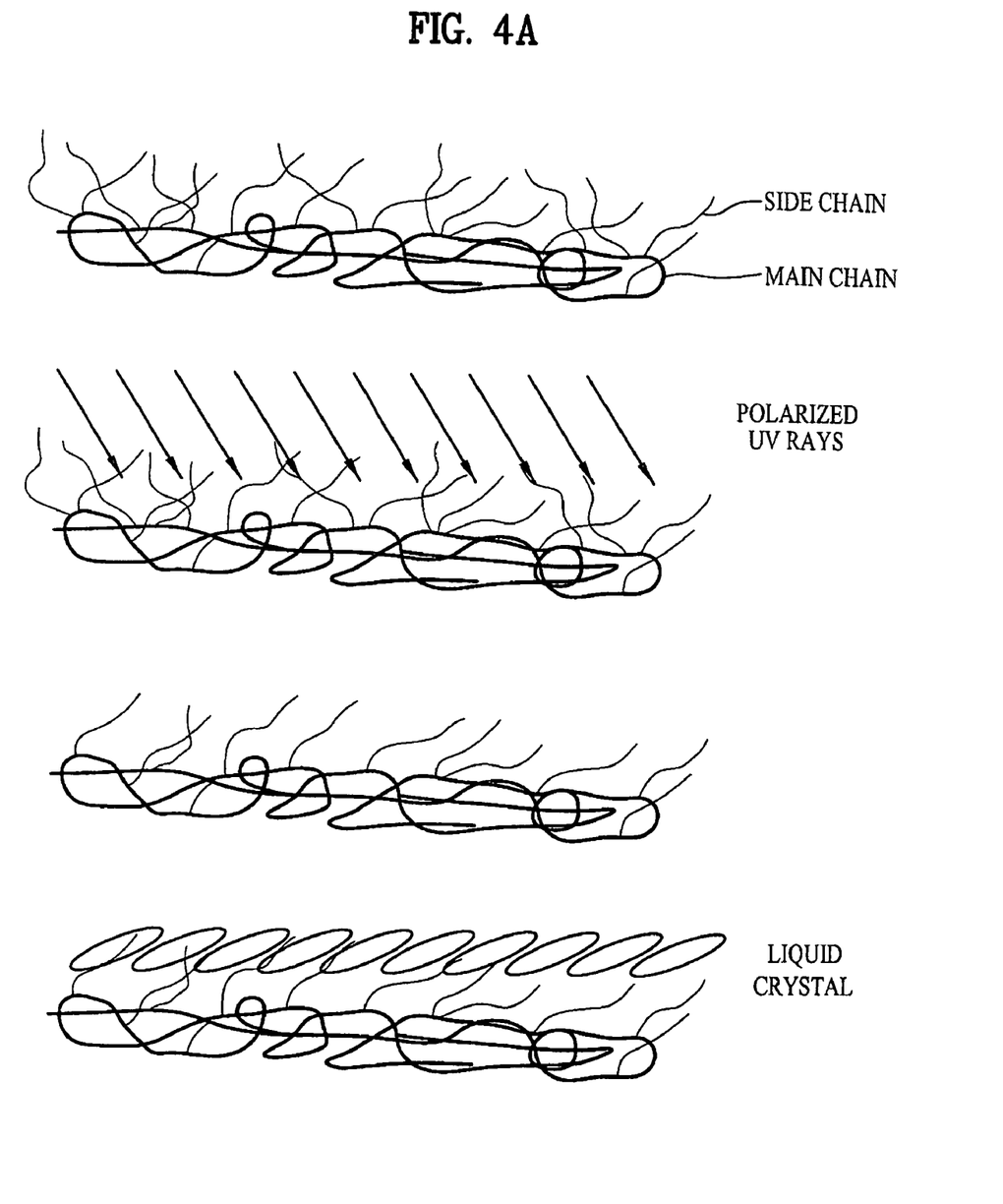
FIGS. 4A to 4C illustrate a photo-alignment method according to an exemplary embodiment of the present invention.

As shown in FIG. 4A illustrating the photo-decomposition reaction, when the polarized UV rays are irradiated on the polymer alignment layer, side chains located in a polarized direction are decomposed. Thus, only the side chains vertical to the polarized direction remain, thereby allowing the liquid crystals to be aligned in that direction.

Figure 4B:
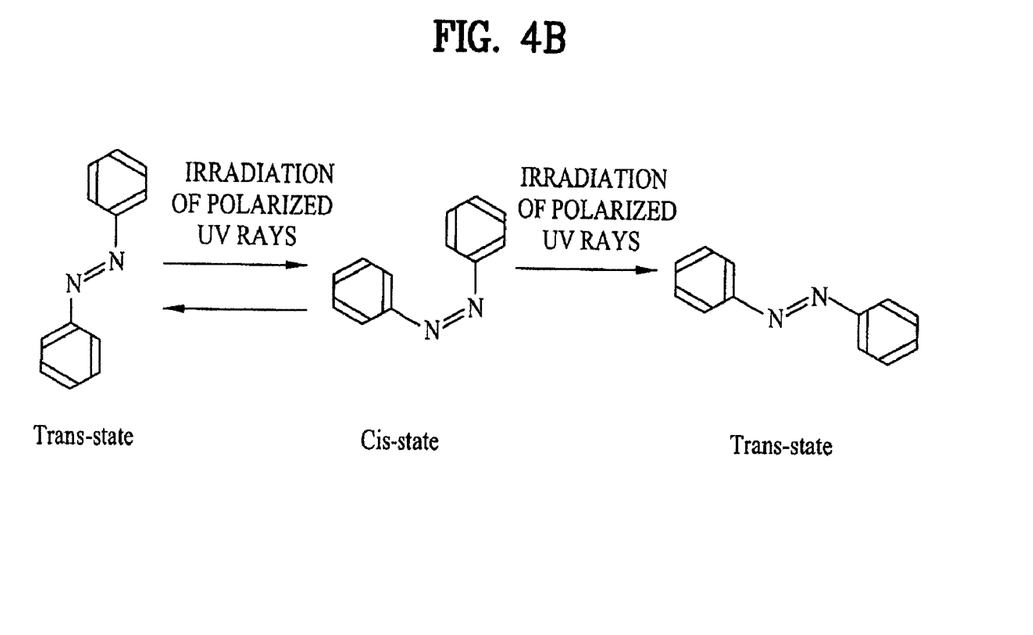

As shown in FIG. 4B illustrating the photo-isomerization reaction, when the polarized UV rays are irradiated on the polymer alignment material, a cis-state polymeric material can be converted to a trans-state polymeric material, and vice versa. In the case of the cis-state polymeric material, the side chains are aligned parallel to the substrate so that the liquid crystals are aligned parallel to the substrate (i.e., homogeneous alignment). In the case of the trans-state polymeric material, the side chains are aligned vertical to the substrate so that the liquid crystals are aligned vertical to the substrate (i.e., homeotropic alignment).

Figure 4C:
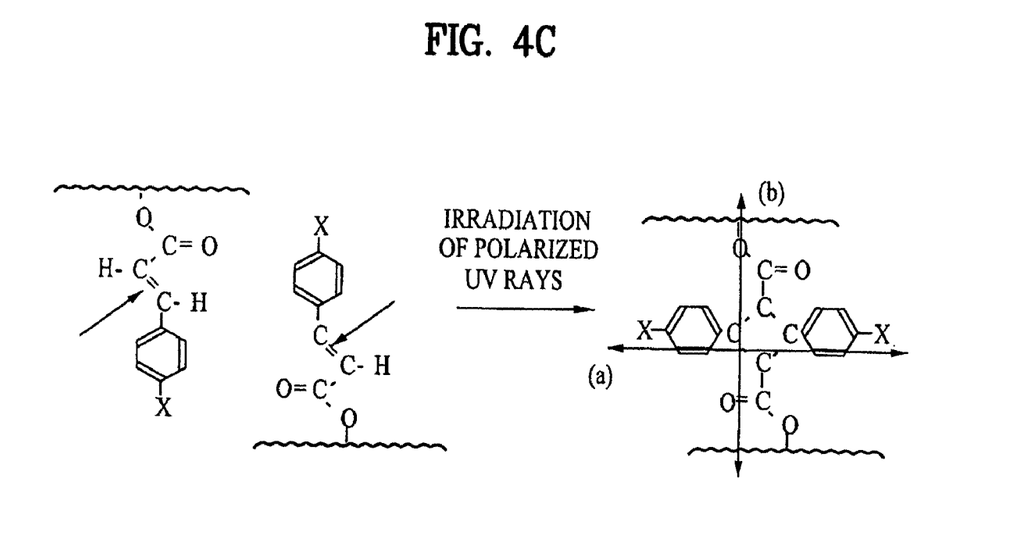

As shown in FIG. 4C illustrating the photo-dimerization reaction, when the polarized UV rays are irradiated, double bonds (marked by an arrow) parallel to the polarization direction are broken and bonded to adjacent molecules. As a result, the liquid crystals are aligned along a direction in which anisotropy is induced (i.e., vertical or horizontal to the polarization direction).

In irradiating the alignment material, the irradiation wavelength of the polarized UV rays may be set in the range of about 200 nm to about 400 nm. As for the polarized UV rays, partially polarized UV rays or linearly polarized UV rays may be used. Additionally, the polarized UV rays may be irradiated obliquely or vertically to the substrate. For example, an irradiation angle of about 60° or less may be used for oblique irradiation. Irradiation of the polarized UV rays may be performed by a scan type light exposure method or by an entire light exposure method. Other angles and types of light exposure may be used without departing from the scope of the present invention.

Since the polarized UV rays are irradiated on the alignment material after aligning the alignment material in a predetermined direction, the response rate is improved by increasing the photo-reaction group that undergoes the photo-reaction. As the response rate is improved, anisotropic characteristics of an alignment layer can be increased. As a result, high anchoring energy is achieved, thereby preventing an afterimage.

It will be apparent to those skilled in the art that various modifications and variations can be made in the method of fabricating a liquid crystal display device of the present invention without departing form the spirit or scope of the invention. Thus, it is intended that the present invention cover the modifications and variations of this invention provided they come within the scope of the appended claims and their equivalents.

What is claimed is:

1. A method of fabricating a liquid crystal display (LCD) device, comprising:
   preparing at least a first substrate;
   coating an alignment material having a main chain and a photo-reactive side chain on at least the first substrate, wherein the main chain is a polymeric material and the photo-reactive side chain is materials having either azo coupling or chalcone;
   aligning the main chain of the alignment material in a predetermined direction by performing a soft rubbing process, wherein the soft rubbing process is performed with a rubbing strength in the range of about 20 mm to about 160 mm and the soft rubbing process is performed with a mark width in the range of about 6 mm to about 14 mm; and
   irradiating polarized ultraviolet (UV) rays onto an entire surface of the alignment material whose main chain has been aligned in the predetermined direction to form an alignment layer, wherein the predetermined alignment direction of the main chain of the alignment material is substantially the same as a polarization direction of the polarized UV rays.

2. The method as claimed in claim 1, wherein the soft rubbing process is performed with rubbing the alignment material only one time.

3. The method as claimed in claim 1, wherein the step of irradiating the polarized UV rays is performed with either partially polarized UV rays or linearly polarized UV rays.

4. The method as claimed in claim 1, wherein the polarized UV rays have an irradiation wavelength in the range of about 200 nm to about 400 nm.

5. The method as claimed in claim 1, wherein the polarized UV rays are irradiated vertically or obliquely to the substrate.

6. The method as claimed in claim 1, wherein the photo-reactive side chain is any one of a photo-decomposition reaction material, a photo-isomerization reaction material, and a photo-dimerization material.

7. The method as claimed in claim 1, wherein the polymeric material selected from a group of polyimide, polyamic acid, polynorbornene, phenylmaleimide copolymer, polyvinylcinnamate, polyazobenzene, polyethyleneimine, polyvinyl alcohol, polyamide, polyethylene, polystyrene, polyphenylenephthalamide, polyester, polyurethane, and polymethyl methacrylate.

8. The method as claimed in claim 1, wherein the alignment material is selected from a group of polyimide of chemical formula 1, phenylmaleimide copolymer of chemical formula 2, polynorbornene of chemical formula 3, and polyamic acid of chemical formula 4, wherein chemical formula 1 is chemical formula 2 is chemical formula 3 is chemical formula 4 is

-continued wherein n and m are integers not less than 1.

9. The method as claimed in claim 1, further including the steps of:
preparing a second substrate; and
bonding the first and second substrates to each other.

10. The method as claimed in claim 9, wherein the step of bonding the first and second substrates to each other includes dropping liquid crystals onto any one of the first and second substrates.

11. The method as claimed in claim 9, wherein:
the step of preparing the first substrate includes forming gate lines and data lines crossing each other to define a pixel region at each crossing region, forming a thin film transistor on each crossing region of the gate line and the data line, the thin film transistor including a gate electrode, a source electrode, and a drain electrode, and forming a pixel electrode connected to the drain electrode of the thin film transistor, and
the step of preparing the second substrate includes forming a light-shielding layer to shield leakage of light, forming R, G, and B color filter layers, and forming a common electrode on the color filter layers.

* * * * *